United States Patent [19]

Ovshinsky

[11] 4,037,679
[45] July 26, 1977

[54] SELECTIVE DRIVE FOR TRUCK DEAD AXLE

[76] Inventor: Herbert C. Ovshinsky, 15200 Leslie, Oak Park, Mich. 48237

[21] Appl. No.: 673,735

[22] Filed: Apr. 5, 1976

Related U.S. Application Data

[63] Continuation-in-part of Ser. No. 574,501, May 5, 1975, abandoned.

[51] Int. Cl.² ............................................. B62D 61/10
[52] U.S. Cl. ..................................... 180/24.12; 180/74
[58] Field of Search ............... 180/24.12, 24.11, 24.08, 180/22, 24.02, 74, 1 R; 280/DIG. 7; 105/112; 152/379 R, 395, 384, 398

[56] References Cited

U.S. PATENT DOCUMENTS

| 1,414,050 | 4/1922 | Simonton | 152/379 R |
|---|---|---|---|
| 1,897,944 | 2/1933 | Carter | 180/24.12 |
| 2,620,010 | 12/1952 | Buckwalter | 152/384 |
| 2,717,654 | 9/1955 | Andersen | 180/24.12 |
| 3,130,965 | 4/1964 | Niclas | 152/384 X |
| 3,447,622 | 6/1939 | Ovshinsky | 180/24.12 |
| 3,805,912 | 4/1974 | Mattson | 152/416 X |

Primary Examiner—Robert R. Song
Attorney, Agent, or Firm—Harness, Dickey & Pierce

[57] ABSTRACT

The selective drive unit performs the function of dual tandem rear differential drive on heavy duty trucks. The drive unit is employed between the tires on the wheels on the driven axle and those on the dead axle. The drive embodies a rotatable axle mounted on the chassis frame or suspended from the two axles with a pneumatic tire fixed on each end of the axle. The inflatable tires are disposed between a set of tires on the driven and dead axle, preferably on or near the centerline therebetween. The drive tires are preferably expandable and simultaneously or selectively inflated to engage the tires on the driven and dead axle on one or both sides of the truck. The inner tires of the pair located on both sides of the chassis frame are engaged by the expandable tires which may have an extending thread which engages the recesses of a matching tread on the truck tires. This provides a positive non-slip drive between the driven tires and those on the dead axle.

The air in the inflatable tires is controlled by the driver from within the cab using the air provided on the truck for operating the brake thereof. The air causes the tires to be pressurized and preferably to be expanded so as to have a substantially flat area of engagement with the tires on the truck. The inflatable tires have the soft rubber surface thereof project within the recessess in the truck tires or, as pointed out above, may have a projecting tread which will mate with the openings in the tire tread to provide a locking engagement which reduces slippage and provides positive and frictionless torque transmission when both of the tires are pressurized. When both of the inflatable tires fixed to the rotatable shaft are pressurized the free wheeling effect of the driven differential is locked and torque from the truck motor is distributed to all eight tires simultaneously. When it is hazardous to lock up all of the eight wheels, only one of the inflatable tires need be pressurized to thereby provide a drive for all of the four tires on one side of the truck.

13 Claims, 15 Drawing Figures

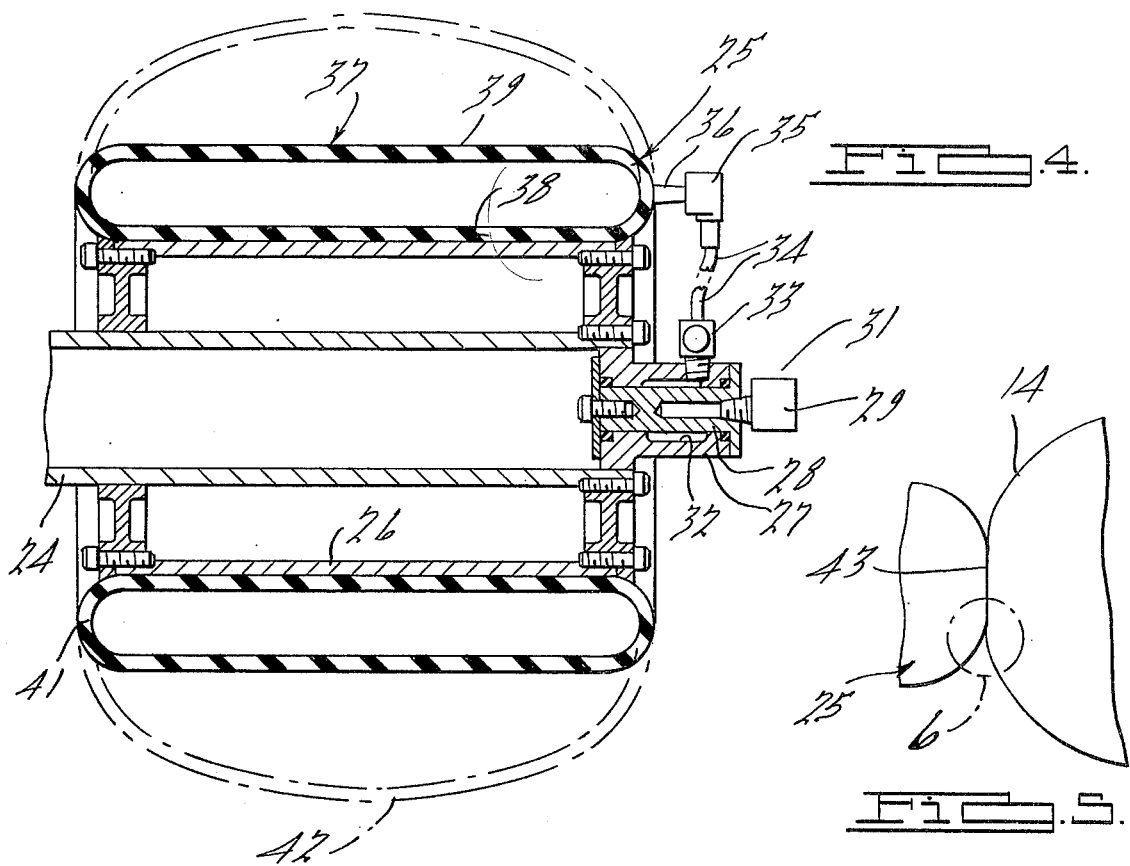
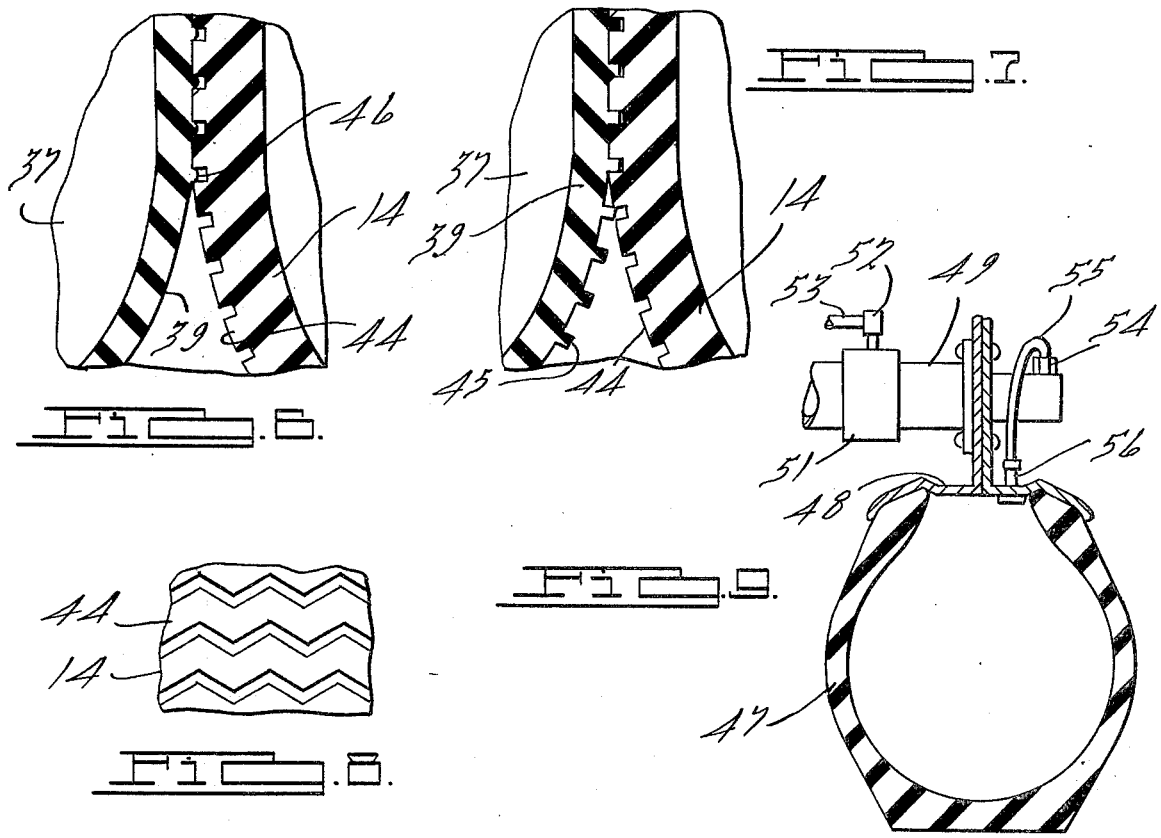

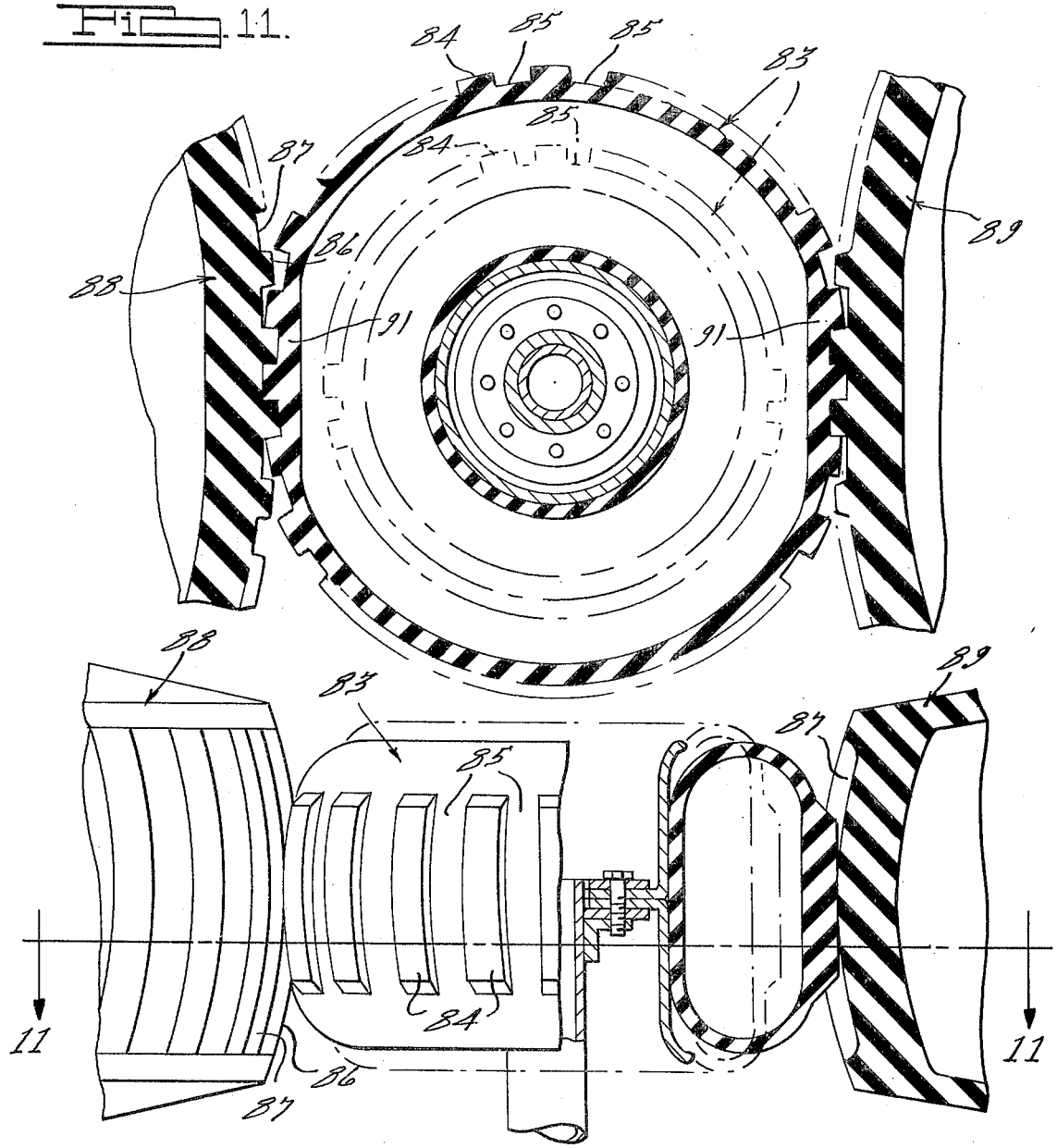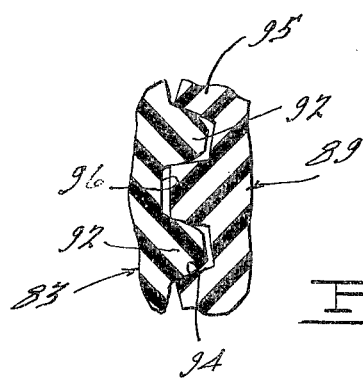

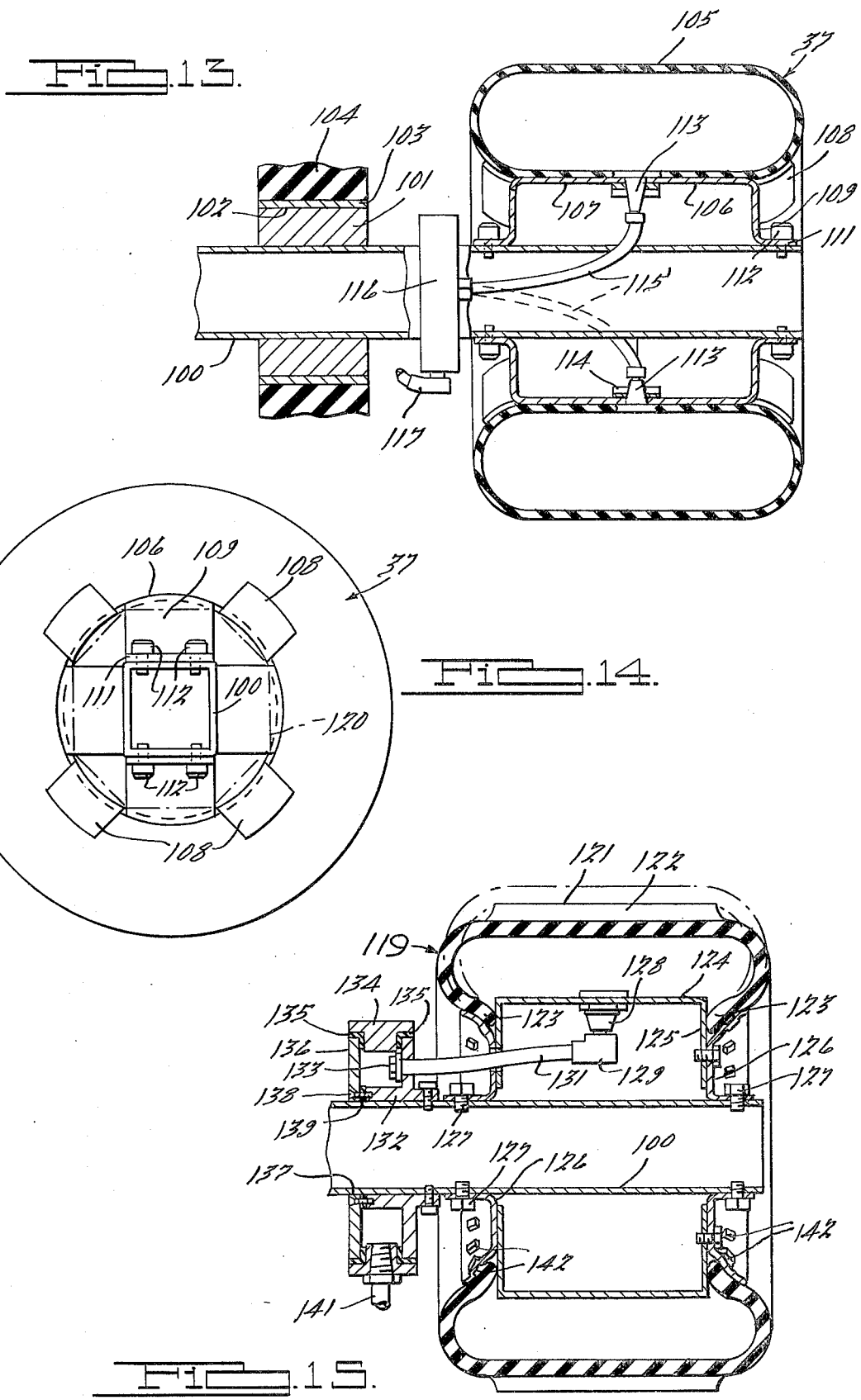

SELECTIVE DRIVE FOR TRUCK DEAD AXLE

RELATED APPLICATION

This application is a continuation-in-part of copending application Ser. No. 574,501, filed May 5, 1975, now abandoned.

BACKGROUND OF THE INVENTION

Reference may be had to the U.S. Pat. No. 3,447,622 and the art which was cited therein to provide a disclosure of a somewhat similar drive between the tires on the wheels of a truck having only the forward set of wheels driven by the truck engine.

SUMMARY OF THE INVENTION

The invention pertains to a drive for a truck having a pair of wheels driven by axles from a differential drive which is forwardly or rearwardly of a dead axle carrying additional wheels and tires. The device embodies a pair of inflatable expandable tires which are mounted on a shaft and rotatably supported on the sprung or unsprung portions of the truck. When the drive device is mounted on a tandem suspension of the Reyco 101 type or the like, a support for the shaft of the inflatable drive tires extend downwardly from the chassis frame which is the sprung part of the vehicle. When the device is mounted on a Reyco 102 or similar tandem suspension, the support for the inflatable tires can be mounted on the unsprung portion of the truck. The Reyco 101 and 102 clearly show the shaft can be supported on either the sprung or unsprung portion of the truck. The shaft is rotatably mounted on the support and is provided with fixed wheels on the ends for supporting the inflatable tires with the center of the inflatable tires aligned with the center of the adjacent truck tires. The inflatable tires are fixed to the ends of the rotatable shaft so that lockup can occur which prevents the wheels on opposite sides of the truck from differentiating. Since "lockup" is objectionable under certain road conditions, arrangement is made to inflate the inflatable tire selectively on either side of the truck when fixed to the rotatable shaft.

The inflatable tire may have a diameter when deflated to clear both of the truck tires and when inflated to expand substantially to provide flat area engagement between the inflatable tire and those of the truck. This provides a slipless drive to substantially reduce wear between the engaged tire surfaces. The inflatable tire may expand 50% in diameter and will withstand a pressure preferably up to approximately 100 psi. The surface of the infaltable tire may have a projecting tread thereon which extends within recesses in the tread of the tires on the driven and dead axle to function somewhat as gears to produce a more positive drive when the tread of the tires permits such engagement. When not so constructed, the soft rubber face of the inflatable tire will be forced into area contact with the truck tires and provides a higher frictional drive therebetween. The truck tire treads provide clearance for water, slush, mud and the like to substantially minmize the lubricating effect of such materials thereby maintaining a large fricitional coefficient drive therebetween. Fixed elements are employed with the shaft to pass air between the stationary and rotating part of the shaft assembly which permits the passage of air into and from the deflatable tires.

BRIEF DESCRIPTION OF THE DRAWINGS

FIG. 4 is a sectional view of an inflatable tire showing the degree of expansion thereof after being inflated;

FIG. 5 is a broken view of the driven truck tire in engagement with the inflatable tire providing a drive relation therebetween;

FIG. 6 is a broken enlarged view of the structure illustrated in FIG. 5, as viewed in the circle 6 thereof;

FIG. 7 is a view of structure, similar to that illustrated in FIG. 6, showing still another form of the invention;

FIG. 8 is a broken view of the outer face of a tire showing the tread face thereof;

FIG. 9 is a sectional view of an inflatable tire mounted on a fixed wheel on the end of a rotatable shaft having a stationary slip ring thereon;

FIG. 10 is a veiw of structure similar to that illustrated in FIG. 5, with parts in section showing a further form of the invention;

FIG. 11 is a sectional view of the structure illustrated in FIG. 10, taken on the line 11—11 thereof;

FIG. 12 is a broken view of a section of the lands on the periphery of the inflatable tire showing teeth of gear-like form thereon;

FIG. 13 is a sectional view of one end of an axle having an inflatable expandable tire on the end thereof;

FIG. 14 is an end view of the structure illustrated in FIG. 13, as viewed from the righthand end thereof, and FIG. 15 is a sectional view of structure, similar to that illustrated in FIG. 13, showing another type of tire secured to one end of an axle.

DESCRIPTION OF THE PREFERRED EMBODIMENTS

Figure 1:
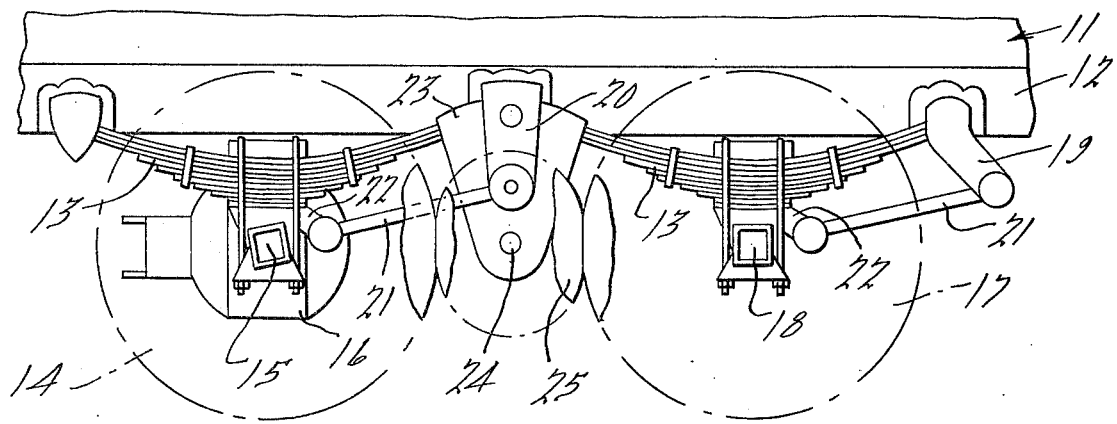
FIG. 1 is a broken view in side elevation of a truck and chassis frame mounted on wheels at one side thereof with the forward wheels driven from a differential and shaft with an inflatable tire between the driven tire and the tire on the dead axle producing a drive therebetween in the manner conforming to the present invention.

A truck has a body 11 mounted on a chassis frame 12 on a set of springs 13 which provides spring support therefor. Driven tires 14 at opposite sides of the chassis frame 12 are mounted on wheels on a pair of axles 15 driven from a differential 16. The tires 17 in the rear of the tires 14 are mounted on wheels on a dead axle 18, the tires 14 and 17 and axles 15 and 18 forming the unsprung portion of the truck. Brackets 19 are employed to stabilize the axles against forward and rearwardly movement when supporting one end of links 21 which are connected to arms 22 of the shaft assembies. A bracket 23 extends downwardly from the bracket 20 and chassis frame 12 for rotatably supporting a shaft 24 having its ends extending beyond the chassis frame centrally between the tires 14 and 17 and preferably in horizontal alignment with the centers thereof. An inflatable tire 25 is mounted on supports at each end of the shaft 24 in position to engage tires 14 and 17 after being inflated to produce a drive from the tire 14 to the tire 17.

One form of the inflatable tire 25 illustrated in FIG. 4 wherein the shaft 24 is rotatably mounted on the sprung or unsprung portion of the truck having supporting structure 26 fixed to each end thereof. Within the ends of the shaft 24 a sleeve 27 is secured for rotation therewith. A cylinder element 28 is mounted within the sleeve 27 and retained against rotation by an elbow conduit 29 secured in the end thereof. A conduit 31 is connected to a supply of air which is delivered to the element 28 from which it passes into a recess 32 in the sleeve 27 and out into an elbow conduit 33 to which a conduit 34 is secured. The conduit 34 preferably takes a partial turn around the sleeve 27 and has an end 35 which is connected to a stem 36 of the expandable tire element 37. The element has an inner wall 38 and an outer wall 39 which are cylindrical in the deflated state and which are connected by semicircular end walls 41. The walls 38 and 39 of the tire element 37 are reinforced by bands of material which have a degree of elasticity and which is wound to provide further elasticity so that the outer wall 39 of the tire element may expand when inflated under substantial pressure to the dot and dash line position 42 shown in FIG. 4. In the inflatable tire herein illustrated an expandable ratio of 50% is obtained. With this amount of expansion it can be appreciated that the tire element 37 in deflated position will be out of contact with the two tires 14 and 17 between which it is mounted. It will further be understood that when inflated with 60 to 100 pounds pressure that the wall 39 will expand outwardly a substantial amount and will provide flat area contact between the surfaces of the tires in the same manner that the truck tires are flat at the bottom when the truck is loaded. This substantial area contact between the tires reduces the slippage between the engaged surfaces and increases the torque transmitting capability of the system thereby eliminating substantial wear which might otherwise occur.

The flat area 43 is shown in FIG. 5 between the inflatable tire 25 and the driven tire 14 which produces a substantially positive drive between the engaged surfaces. In FIGS. 6, 7 and 8, a tread 44 is illustrated on the tire 14 which is preferably duplicated on the face of the tire 17 which provides substantial traction between the tire and the road surface. The outer wall 39 of the inflatable element 37 has a tread 45 thereon which mates with the tread 44 on the tires 14 and 17. Initial slippage between the tires produces the mating engagement between the treads so that a positive drive is provided between the three tires. In FIG. 6, the outer wall 39 of the inflatable tire element 37 is soft and deflectable so that portions 46 will be forced into the recesses of the tread 44 in the flat engaged area to provide more positive drive and eliminates any substantial slippage between the engaged tire surfaces.

In FIG. 9, a standard tire 47 for a small airplane is shown mounted on a small wheel 48 which is fixed to the end of a shaft 49 which is rotatably supported in a manner not herein illustrated. Air is directed into a blocked off inner area at the end of the shaft by a slip ring 51 which has an elbow 52 thereon and a conduit 53 connected thereto which leads from a valve within the cab of the truck. The air from within the rotatably shaft 49 passes out through an elbow 54 to a wrapped around conduit 55 to a stem 56 on the tire wheel. The tire 47 is not as expanable as the tire 25 and may not deflate to a point where it is disengaged from the two tires 14 and 17. The tire 47 may be rotated without any driving force being applied to the rear tire 17. Upon inflation, however, the tire will engage the two truck tires 14 and 17 under substantial pressure which will provide flat areas between the tires to produce a substantially non-slip drive therebetween. While the tire 25 is of special construction and will require special materials, the tire 47 is of standard form to be used on small airplanes and the like and can be as effective as the inflatable tire 25 when driving the rear tire 17 and wheels on the dead axle 18.

Figure 2:
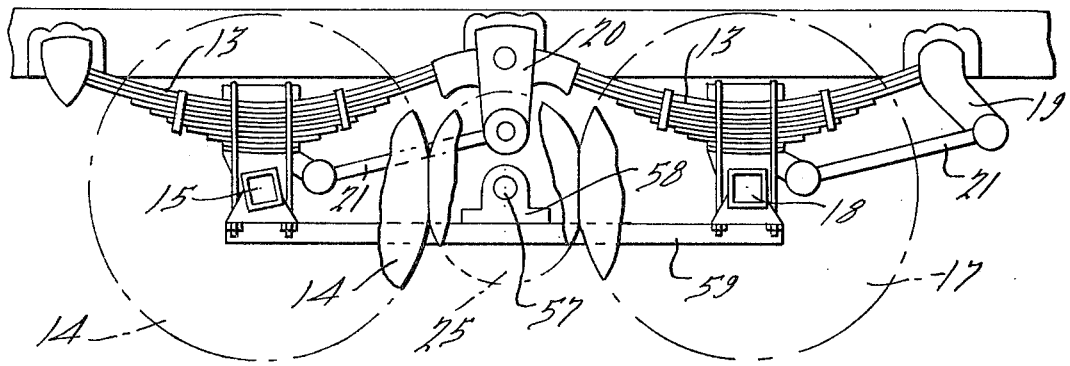
FIG. 2 is a similar view of the structure illustrated in FIG. 1, with the inflatable tire mounted on the unsprung portion of the vehicle.

The tire 25 is mounted on the shaft 24 which is supported on the brackets 23 secured to the sprung chassis frame which changes the position of the shaft 25 relative to the shafts 15 and 18 when the truck 11 is loaded or loaded different amounts. The structure illustrated in FIG. 2 provides a mount for a rotatable shaft 57 which is supported by the axle structure which is the unsprung portion of the truck. In this arrangement, the shaft 57 maintains its alignment with the shafts 15 and 18 for all loads within the truck body. The ends of the shaft 57 are mounted in brackets 58 which are supported on cross members 59 secured on the supports for the axles 15 and 18. The tires 25 may be fixed to the shaft ends so that when both of the tires 25 are inflated the differential for the axles of the tire 14 cannot differentiate and all of the tires are therefor locked in driven relation to each other.

Figure 3:
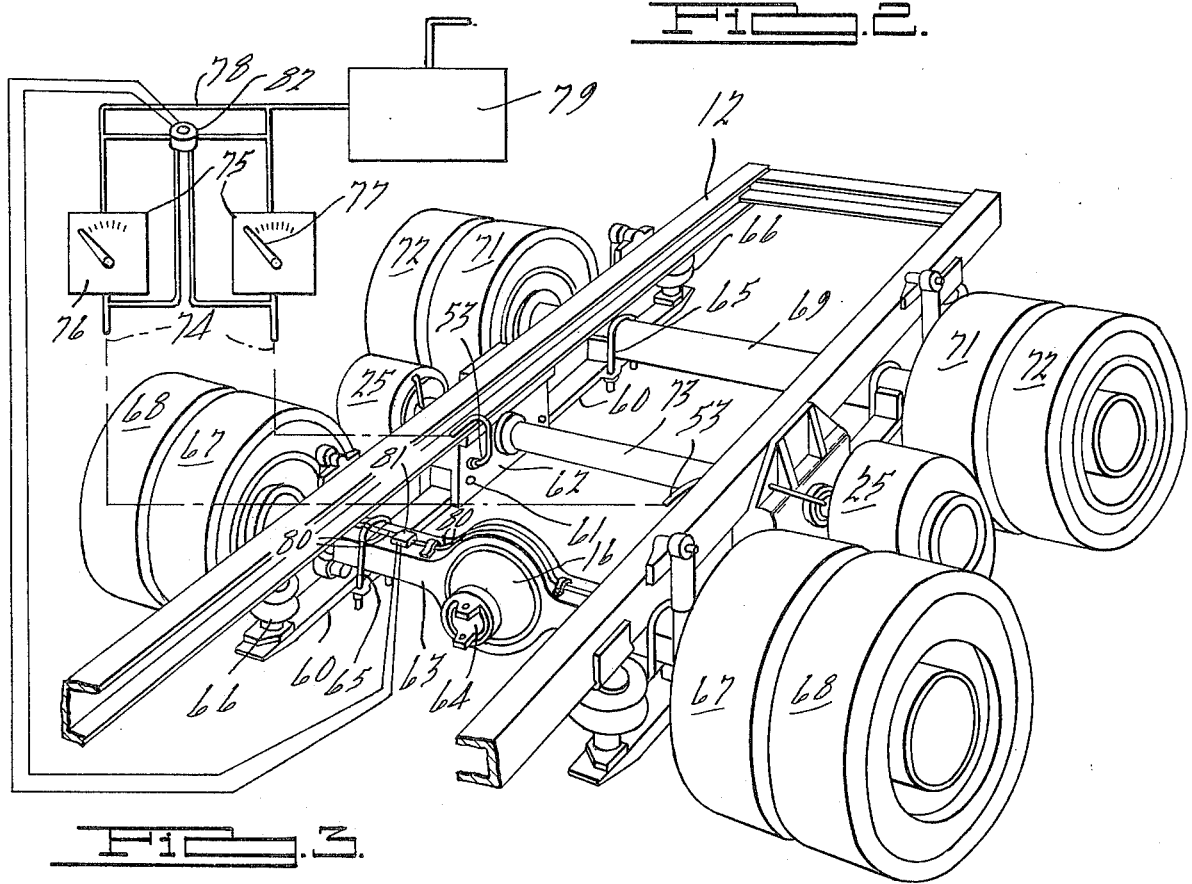
FIG. 3 is a positive view of a chassis frame having forward driven tires which drive the tires on the dead axle therebehind through the inflatable tire embodying the present invention, with a diagrammatic showing of the valves and conduits in the cabin which produces the tire inflation.

In FIG. 3, a further form of the invention is illustrated that wherein the chassis frame 12 is suspended on spring arms 60 which are secured on pivots 61 to the brackets 62 supported on the underface of the chassis frame 12. The arms 60 are secured to a banjo housing 63 of the differential 64 by supporting structure 65 which includes inverted U-shaped brackets. The ends of the arms 60 have air bags 66 secured thereto and to the underface of the chassis frame 12 to provide spring support therefor. The axles and the differential 64 supports the pairs of driven tires 67 and 68 on both sides of the truck. A dead axle 69 is supported by supporting structure 65 to the arms 60 which extend rearwardly from the bracket 62 and support the pair of tires 71 and 72 on both sides of the truck and are employed to help support the load without assisting in the driving thereof.

The bracket 62 supports a shaft 73 which has the inflatable tires 25 on the ends aligned wth the tires 67 and 71. Conduits 53 extend to slip rings 51 (not herein illustrated) which supplies air to the inflatable tires 25 in the manner pointed out hereinabove with regards to the structure illustrated in FIG. 9. Air to each of the conduits 53 is selectively provided through conduits 74 from valves 75 operated by a valve handle 76 and 77. A supply of air is provided from a conduit 78 from an air tank 79 connected to the air supply for the brakes of the truck. By providing separate handles 76 and 77 within the cab of the truck the driver may inflate both of the tires 25 at substantially the same time or may inflate only one thereof as the inflatable tires are fixed to the supporting shaft and are driven simultaneoulsy. Such a simultaneous drive, as pointed out above, should be avoided under certain conditions and therefor either one of the two valves may be used to inflate the tires at either side of the chassis frame. It is to be understood that a single valve could be employed having one handle to produce the actuation to perfrom the same results as described hereinabove with regard to the two valves having the two handles.

A further arrangement, as illustrated in FIG. 2, is that for inflating both of the tires 25 when deceleration of a driven wheels 67 is indicated to eliminate the skidding which might otherwise occur. The pair of conductors 80 from a sensing device (not shown) but which is well known in the art located on each of the driven wheels 67 indicate the rapid deceleration of a wheel upon the application of the brakes to both of the wheels. The signal resulting therefrom indicates a possible skid and such signal is amplified in a device 81 which operates a valve 82 and applies pressure to both of the tires 25 to thereby produce a lock-up between the two driven wheels 67 to bring their operation to the same speed to thereby avoid the indicated possible skid. When the two tires 25 are inflated, the two wheels 67 will be maintained in operation at the same speed and the operation of the two wheels at different speeds is thereby prevented.

Referring to FIGS. 10 and 11, a more specific arrangement is illustrated for showing the engagement of the lands and grooves provided on the central peripheral surface of the inflatable tire which functions as gear teeth with the lands and grooves forming the anit-sid surface on the periphery of the driving and tag axle tires. The inflatable tire 83 has gear-like teeth 84 on the outer periphery thereof with spaces 85 therebetween, all of which retracts when the tire is deflated causing the spaces 85 and the teeth 84 to reduce in width. There is, accordingly, no driving fit between the teeth 84 of the inflatable tire 83 and the lands 86 and spaces 87 on the driven tire 88 and on the tag axle tire 89 provided on oppoiste sides of the truck. When, however, the inflatable tire 83 is expanded by the air conducted therewithin, the teeth 84 and spaces 85 expand with the lands and spaces on the tires 88 and 89 within the flattened areas 91 which are the driving area between the driven tires 88, the inflatable tires 83 and the tag axle tires 89. The driving is a positive one and becomes effective when the inflatable tires are inflated. This non-slipping engagement between the lands and spaces of the tires 88 and 89 and the inflatable tire 83 produces a positive driving connection between the three tires at each side of the truck which, when the inflatable tires are fixed to the ends of the cross shaft 73 provides a perfect control between the driven tires 88 and the tag axle tires 89 to have the tires 88 and 89 positively driven at a constant speed on both sides of the truck so that the tires on one side of the truck cannot increase or decrease their speed relative to the speed of the tires on the opposite side of the truck.

In FIG. 12, the lands 92 of the inflatable tire 83 have a gear-like form 94 on the side faces to provide a rolling action with the lands 95 on the tires 88 and 89 which when jammed within the spaces 96 between the lands 92 produce a similar shape to the lands and a gear-like rolling therewith. In this arrangement, a reduction in friction between the lands of the inflatable tire and the lands on the tires in engagement therewith is substantially reduced.

In FIG. 13, the expandable tire element 37 is illustrated mounted on a cross shaft 100 which is square in section, having a cylindrical supporting element 101 containing a square hole 102 which receives the cross shaft 100 to rotate therewith. A bearing of brass or other material 103, of the sleeve type, engages the outer surface of the supporting element 101 on the outer surface of which a soft resilient supporting material 104 is provided which permits movement of the cross shaft 100 so that it can seek a position between the wheels 67 and 71 on the driven and tag axles. The outer periphery 105 of the inflatable tire is provided with teeth 84 and groovs 85 as pointed out hereinabove with regard to the inflatable tire illustrated in FIGS. 10 and 11 so as to produce an engagement with the lands and grooves on the tires 88 and 89. The tire 37 is mounted on right and left-hand cylindrical elements 106 and 107 which are slid into the tire aperture from the right and left ends. The ends of the cylindrical elements 106 and 107 are cut into sections to have alternate sections curved up at 108 to engage the tire when deflated and four sections 109 therebetween which are bent inwardly and outwardly to form flanges 111 which engage the four sides of the cross shaft 100 and to which they are secured by screws 112. When expanded, the inflatable tire moves out of engagement with the alternate sections 108.

The tire 37 has valve stems 113 which are engaged by curved reinforcing plates 114 and contact the stem on each side thereof. The two valve stems 113 are employed to permit the inflatable tire to be filled wth air in a very short time in case a skid occurs between the wheels 67 and 71 and the ground when the brakes are applied. Air is admitted through tubes 115 to the valve stems 113 from the inner rotatable portion on the axle enclosed by a fixed collector ring 116 to which a supply conduit 117 is connected. The inner rotatable portion has a square aperture which is engaged by the cross shaft 100 and is disposed in sealed relation to the ring 116. The cylindrical elements 106 and 107 have other forms to prevent rotation therebetween, the dot and dash lines 120 illustrates an actogon shape. Serations could be provided to prevent slippage between the tire 37 and the supporting structure.

A similar arrangement is illustrated in FIG. 15, wherein a standard airplane, helicopter or like tire 119 has lands 121 and grooves 122 on an outer periphery and have beads 123 which are to be sealed to the supporting elements. A cylindrical member 124 has end washers 125 sealed thereto which may be slipped into position between the beads 123 when the tire 119 is somewhat flattened. After being inserted within the tire, the cylindrical member 124 is slid upon the end of the cross shaft 100 against a rim element 126 which moves into sealed relation with the bead 123 when secured by screws 127 to the end of the cross shaft. A like rim element 126 is then slid upon the end of the cross shaft 100 in sealed relation to the bead 123 when secured in position by the screws 127. The cylindrical element 124 is, in this manner, fixed to the ends of the cross shaft 100 to rotate therewith. One or more valve stems 128 is mounted in apertures in the cylindrical element 124 having a cap 129 secured thereto from which a stem 131 extends within a driven element 132 which has a square opening and a cylindrical flange extending therefrom. A nut and washer 133 seals the end of the stem 131 to the cylindrical extension of the element 132. A slip ring 134 has seals 135 in the outer shoulder portions and this is applied over the circular edge of the driven element 132. A washer element 136 has a square central aperture 137 which fits on the end of the cross shaft 100 and engages a seal 139 and the vertical portion of the seal 135 when secured to the element 132 by screws 138. This will permit the slip ring 134 to be maintained stationary by the intake air pipe 141. The valve stem 128 has a large capacity so that the tire can be filled almost instantly and if less time is necessary a second or third valve stem 128 can be employed.

The tire 119 functions in the same manner as the tire 37, being expanded outwardly to a new diameter to have the lands and grooves 121 and 122 thereof engage the lands and grooves 86 and 87 of the tires 88 and 89 in gear relationship, as illustrated in FIG. 11. When deflated, the tire will shrink in diameter and move out of contact with both of the tires 88 and 89 with the lands and grooves decreasing in width so as to no longer be capable of mating with the lands and grooves of the tires so long as the inflatable tire is deflated. To prevent slippage between the inflatable tire and the rim elements 126, the top flange is provided with offset portions 142 to form a waffle or gear-tooth appearance which receives spaced lands and grooves on the mating surface of the beads 123.

What is claimed is:

1. In a drive for the tires of wheels on a dead axle of a vehicle disposed behind or in front of a differentially driven axle, a through rotatable shaft fixedly supported substantially midway between the centers of the driven and dead axles approximately in alignment therewith, an expandable tire fixedly mounted on each end of said rotatable through shaft so as to be located between said wheel tires, expanding means on said vehicle, and means expanding said expanding means to provide a drive when expanded between the tires on the wheels of the differential axle and the tires on the wheels on the dead axle.

2. In a drive as recited in claim 1, wherein valve means is provided for directing a flow of fluid to each of the expandable tires to have them inflated selectively or simultaneously.

3. In a drive as recited in claim 2, wherein the tires on the wheels on the differential and dead axles have a gear-like tread thereon provided by spaced lands and grooves, and wherein said expandable tires have a tread thereon composed of lands and grooves which are matable with the spaced lands and grooves of said tread on the first said tires when inflated to provide a gear-like drive relation therebetween.

4. In a drive as recited in claim 3, wherein said expandable tires have lands and grooves thereon which do not mate with the lands and grooves on the wheel tires when the expandable tires are retracted but which is stretched to be in mating relation with the lands and grooves on the wheel tires when the expandable tires are inflated.

5. In a drive as recited in claim 3, wherein the sides of the lands of the expandable tire are of arcuate form to approximate the operation as involute gear teeth when in mesh with a mating tread on the vehicle wheels.

6. In a drive as recited in claim 1, wherein said rotatable shaft has flat sides, bearing means fixed to said shaft having a circular periphery, a ring in engagement with said bearing means, and an elastomeric member supporting said ring.

7. In a drive as recited in claim 1, wherein said expandable tires are toroidal in shape, and ends on said through shaft to which said toroidal tires are affixedly mounted are of polygonal shape.

8. In a drive as recited in claim 1, wherein said supporting means on the ends of the shaft embodies a pair of cylindrical elements which mate at the center of the tire and which are split on the ends to provide alternate arcuate projections extending upwardly to engage the inflatable tire when deflated, spaced supporting sections disposed between the arcuate projections which extend inwardly and are flanged ouwardly to engage the shaft, and means securing said flanges to said shaft.

9. In a drive as recited in claim 8, wherein the inner engaged ends of the cylindrical elements have at least one reinforcing plate thereon which is slotted to receive the stem of the tire which is reinforced thereby.

10. In a drive as recited in claim 1, wherein said expandable tires are of bead-type construction, a cylindrical member having end washers sealed thereto for fixedly mounting an expandable tire to each end of said through shaft, and washer means releasably attachable to said end washers for clamping the free edges of said expandable tires therebetween to form sealing grooves and fluid-tight seals with said free edges.

11. In a drive as recited in claim 10, wherein said expandable tires have projections molded radially outward on the sides of said free ends, and wherein said washer means have recesses mateable therewith for reducing the possibility of slippage therebetween.

12. In a drive as recited in claim 11, wherein a tire stem is secured in said cylindrical supporting means, and a tube extending from said stem outwardly to rotatable portion of a fluid delivery element supported by said shaft.

13. In a drive as recited in claim 12, wherein screws secure said cylindrical supporting means to said shaft.

* * * * *